May 10, 1966   A. SABATINO   3,249,981
GRID FOR BATTERY PLATES
Filed Sept. 11, 1963
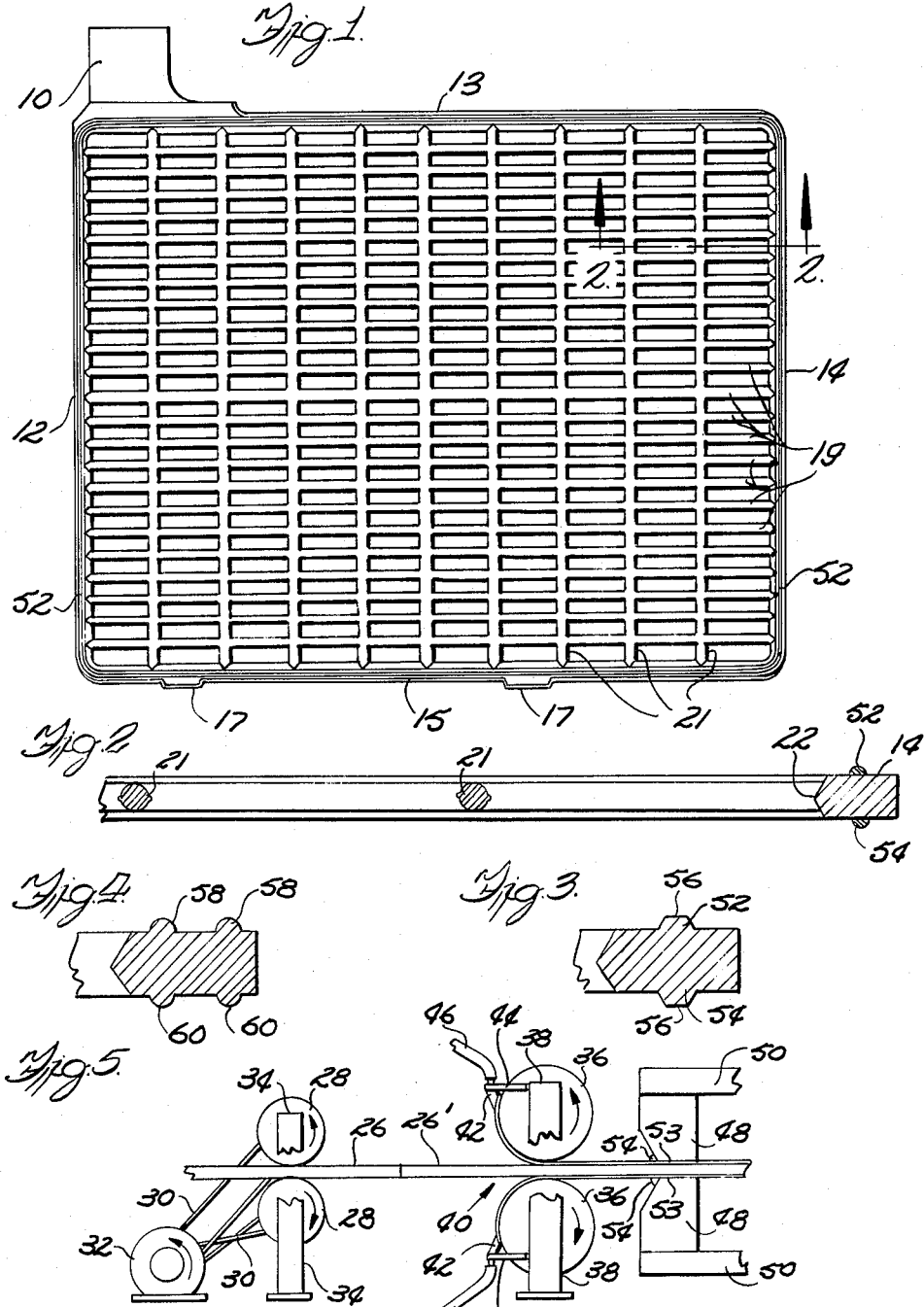
INVENTOR.
Anthony Sabatino
BY
Pendleton, Neuman,
Seibold & Williams
Atty's.

3,249,981
GRID FOR BATTERY PLATES
Anthony Sabatino, Milwaukee, Wis., assignor to Globe-Union Inc., Milwaukee, Wis., a corporation of Delaware
Filed Sept. 11, 1963, Ser. No. 308,264
6 Claims. (Cl. 29—2)

This invention relates to electrode plates for use in storage batteries, and more particularly to an improved configuration of the grids of which said plates are formed.

In the manufacture of storage batteries, a number of spaced-apart electrode plates are suspended in an electrolyte such as sulphuric acid to present an electrical potential difference between alternate ones of the plates. Such electrode plates are commonly constructed in the form of a grid of lead-antimony alloy, to which a paste of lead oxide is applied to form the electrode. The grid serves both as a supporting frame for the electrode plate, and as an electrical conductor for carrying current to or from the plate.

The grids are made by heating the lead-antimony alloy to its melting point, and allowing the same to solidify in a mold. Thereafter the electrode plates are usually manufactured by an assembly line process in which the grids are passed through a pasting machine adapted to apply an aqueous lead oxide paste to the grid. The paste preferably includes a small amount of sulphuric acid which acts as a bulking agent and cementing agent. The lead oxide paste fills the interstices of the grid and thereby forms, upon drying, a multiplicity of bricks, each lodged in a space of the grid.

It is desirable that all of the grids in a battery be provided with the identical thickness of the lead oxide paste. Wide variations in the amount of paste deposited raises the cost of the completed battery in that the capacity of the battery is dependent upon the amount of lead oxide in each cell.

In practice, however, it has been difficult to manufacture plates having constant thicknesses, due to mold tolerances, and protuberances and the like projecting from one or both sides of the grids that are formed on the grids while they are cast in the grid molds. The molds are customarily lined with heat insulating material, which is subject to wear and therefore causes variations in thickness of the grids. These variations, when passing through the pasting machine, cause the formation of plates having appreciable variations in thickness and in the total amount of oxide deposited. In addition, if the pasting machine is provided with an aperture or orifice of fixed width in an attempt to obtain uniform paste thickness, a protuberance projecting from a grid may prevent the grid from passing through the orifice, and thus cause a jam or damage the grid and produce a defective plate.

Furthermore, with a pasting machine having a fixed orifice, undersize grids result in the application of paste to the frame or edges of the grid, where it is not wanted.

One way in which the prior art attempted to overcome the disadvantages of unwanted protuberances was to subject the entire grid to heavy pressure in a hydraulic press or the like, to flatten the protuberances against the grid. This method requires a considerable amount of power, to bring all grids to a standard dimension irrespective of warpage, mold tolerances, flash, protuberances and the like. In some cases such heavy pressures introduce additional distortion. If the power applied to the press is inadequate, the pressure required being a variable dependent upon the shape and character of each grid, the disadvantages associated with the unpressed grid remain.

It is therefore an object of the present invention to provide a battery plate having a constant thickness of paste disposed on a grid.

It is another object of this invention to provide an improved battery plate construction having dam-like peripheral lead alloy ridges to insure a uniform deposit of lead oxide in the grid interstices.

Another object of the present invention is to provide a method of making a battery plate having a constant thickness of paste disposed on a grid, the method including the formation of a ridge on the rim of the grid, flattening a portion of such rim to provide a grid having a dam or gauge portion of predetermined standard thickness and filling said grid with paste to form a plate having substantially that standard thickness.

A further object of the present invention is to provide a method of manufacturing battery plates including the step of flattening a portion of the plates to maintain a standard thickness of said plates, said plates being so configured as to provide for such flattening with a relatively low fixed amount of power. As used herein, the term "flattening" is intended to cover any process for producing a relatively flat surface, such as, for example, milling, grinding, swaging, etc.

These and other objects and advantages of the present invention will become manifest on a consideration of this specification, the accompanying claims and drawings.

In one embodiment of the present invention, there is provided a grid for supporting a battery plate formed substantially in a single plane, and having a peripheral ridge extending normally from each side of the grid. This ridge is adapted to be flattened by stamping or swaging the plates in a press such that the distance between the flattened portions of the ridges on the opposite sides of the grid is the same over its entire periphery. The flattened ridges are thereupon employed to gauge the application of a constant thickness of paste to the grid.

Reference will now be made to the accompanying drawings in which:

FIG. 1 is a plan view of a battery grid incorporating the present invention;

FIG. 2 is an enlarged cross section taken in the plane 2—2 of FIG. 1;

FIG. 3 is a fragmentary view, partly in cross section, of a portion of the grid of FIGS. 1 and 2 after flattening of the ridge;

FIG. 4 is a fragmentary view, partly in cross section, of an alternative grid embodying the present invention; and FIG. 5 is a schematic diagram of a pasting machine for coating the battery grids with paste material to form a battery plate.

Referring now to the drawings and particularly to FIGS. 1 and 2, there is illustrated a battery grid formed in substantially a single plane and having a tab 10 adapted to be in electrical contact with and fused to an external conductor, and thus serve as a terminal for the grid. The periphery of the grid is defined by a rim, generally formed in the shape of a rectangle having sides 12, 13, 14 and 15. The side 13 is integral with the tab 10, and the sides 12 and 14 extend from opposite ends of the side 13 to the ends of the side 15. The side 15 is provided with a pair of short tabs 17 extending therefrom which serve to support the plate in a completed battery.

In use, the battery grid is filled and substantially covered with a paste of lead oxide which afterwards may be treated by charging to form either a positive or negative plate of a storage battery. In such batteries, the plates are normally positioned with the tabs 17 downwardly, and the tab 10 upwardly and connected to an external conductor formed in the shape of a comb and terminal post.

A multiplicity of horizontal rods or ribs 19 and vertical rods or ribs 21 are connected between the sides 12 and 14, and 13 and 15, and to each other to form a multiplicity of rectangular spaces adapted to hold a brick of lead oxide. The grid members 19 and 21 are substantially round in cross section as illustrated in FIG. 2, while the cross section of the sides 12 to 15 is substantially rectangular, the interior side 22 of the rectangles being slightly beveled in order to permit easy extraction of the battery grid from the mold in which it is made.

Battery grids are preferably composed of lead, alloyed with a very small percentage of antimony for stiffness. The alloy is substantially inert in the presence of battery acid and the grid is designed to minimize the electrochemical activity thereon during battery action. Such alloys are well known in the art.

The battery grids are made into battery electrode plates by applying lead oxide paste to the grid to coat both surfaces and fill the interstices thereof, whereby the grid elements 19 and 21 are surrounded with paste and hold the lead oxide in place with respect to the grid after the lead oxide has dried. The lead oxide paste is normally applied to the grid by a pasting machine such as that illustrated schematically in FIG. 5.

A grid 26 is advanced by rotation of a pair of feed rollers 28 which are rotated by a pair of belts 30 connected between the feed rollers 28 and a motor 32. The feed rollers 28 are supported for rotation by a support mechanism 34, shown partly broken away.

As the grid 26 is advanced by the rollers 28, it pushes an adjacent grid 26' through the pasting apparatus, the grids being confined to a substantially linear path by means not shown. The pasting apparatus may be any one of a plurality available from commercial manufacturers. The apparatus diagrammatically shown in FIG. 5, comprises a pair of pasting rollers 36 supported for rotation with respect to a frame 38, shown partly broken away and driven by power means not shown. The nip 40 between the pasting rollers 36 is maintained slightly larger than is desired for the layer of lead oxide paste to be placed in the grid. The lead oxide paste is administered to the pasting rollers 36 by applicators 42 supported from the frame 38 by members 44, and are each connected to hoses 46 through which the lead oxide paste is pumped for application to the battery grid. The rollers 36 force the oxide into the interstices of the grid and insure a build-up on the grid in excess of that desired in the final product. The nip 40 between the rollers 36 is adjusted to insure this desired build-up.

A pair of gauge blocks 48 are disposed above and below the path of the grid 26' as it leaves the pasting rollers, the blocks 48 being secured to the members 50. The opposing surfaces 53 of the blocks 48 are thus supported in fixed relation, a predetermined distance from each other. The blocks function to scrape excess lead oxide paste from the grid 26' at 54, and exactly determines the thickness of lead oxide paste applied to each of the grids.

In the prior art, the use of fixed gauge blocks 48 occasionally caused jams to occur in the pasting machine due to oversize grids, slightly distorted grids, or protuberances extending outwardly from the plane of the grid which engage the side wall of the gauge blocks 48 and prevent the grid from passing therebetween. Furthermore, undersize and slightly distorted grids resulted in poor pasting and loss of paste through the gauge blocks 48.

In the improved grid of the present invention, however, ridges 52 and 54 are provided on the opposed surfaces of the rim of the grid defined by the sides 12 to 15, and extend continuously around both sides of the rim. The thickness of the sides 12 to 15 is normally substantially greater than the thickness of the grid members 19 and 21, as shown in FIG. 2, and the ridges 52 and 54 extend outwardly from the sides 12 to 15 of the rim in each direction initially somewhat more than the desired thickness of the lead oxide paste which is to be applied to the grid in the ultimate product. The ridges 52 and 54 are subjected to a stamping operation in order to provide a flatttened surface 56 (FIG. 3) on each of the ridges 52 and 54, which surfaces are exactly spaced by the desired thickness of lead oxide paste to be applied to the grid. This stamping or swaging may be performed at the same time that the grid is trimmed after casting.

The ridges 52 and 54 have a distance between their flattened surfaces 56 which is greater than any protuberances which may project from the grid members 19 and 20, and just slightly less than that provided between opposing surfaces 53 of the gauge blocks 48. Thus the grid easily passes through the fixed space between the gauge blocks 48 to even the coating of paste applied to the grids without causing the grids to jam against the gauge blocks 48. The ridges 52 and 54 also serve as dams during the application of the paste by the pasting rollers 36, and during the doctoring action of the gauge blocks 48, preventing paste from squirting transversely while the grids are proceeding through the pasting machine. Accordingly, the ridges 52 and 54 serve the multiple function of producing a more consistent product, conserving lead oxide paste, and accurately gauging the thickness of such paste applied to the grids.

Although fixed gauge blocks have been illustrated in FIG. 3, other apparatus for scraping off excess paste above the plane defined by the flattened surfaces 56 may be employed. For example, the scraping apparatus may be resilient, or having a shiftable doctor blade, in as much as the pasting machine applies substantially the same amount of paste to each grid, as measured by the ridges 56.

The stamping of the ridges 52 and 54 is preferably effected by a power driven press by compressing the grid between two opposed surfaces. The pressing surfaces are accurately limited in their stroke to prevent the pressing surfaces from closing more than the predetermined desired distance between the flattened surfaces 56 of the ridges 52 and 54. Alternatively, the grid may be rolled by passing the same through the nip of a pair of rollers which are separated by the desired predetermined distance, in order to flatten the ridges 52 and 54; or the ridges 52 and 54 may be ground or milled to produce the flattened, spaced surfaces 56.

While the size and shape of the ridges 52 and 54 may be varied depending on the design of the grid, the precision required in a given product, and the production equipment employed, a ridge initially rising from .010 to .030 inch above the peripheral rims 12–15 and having a semicircular cross section are generally satisfactory. These may be flattened to about .005 to .025 in processing. Other cross sections exhibit certain desirable characteristics. For example a triangular cross section generally reduces the force necessary for flattening the ridges with rapidly increasing resistance to deformation with increased flattening.

The principal requirement on the size and shape of the ridges is of course that the height of the ridge and the degree of flattening exceeds the production tolerances on the grids so that flattening occurs to some extent over the entire periphery to insure the uniform transverse dimension which is desired.

The power required to flatten the ridges 52 and 54 is relatively low because of the relatively small area of the flattened surfaces 56, and this power is substantially constant because it is independent of the shape or size of the various tab portions of the grid and the number and size of the grid web members 19 and 21.

In FIG. 4, an alternative embodiment of the present invention is illustrated in cross section wherein a pair of ridges 58 and 60 are cast into each side of each portion of the rim of the grid. This embodiment serves as a more effective dam during the pasting operation, but more power is required to flatten the ridges.

While it is preferred that the ridges 52 and 54 be of a continuous peripheral nature, it is contemplated that in large grids an intermediate rib 21a may also include a ridge or ridges similar to those on the periphery. Also while a continuous ridge is preferred because of the damming feature, intermittent ridges or bosses can be employed and obtain many of the advantages of this invention.

The foregoing will sufficiently describe the present invention to enable those skilled in the art, by applying current knowledge to adapt the same for use under varying conditions of service without departing from what may be said to constitute the essential features of novelty involved which are desired to be defined and secured by the appending claims.

What is claimed is:

1. A method of making a battery grid comprising the steps of forming a grid having a peripheral grid and a plurality of interior grid members, forming a first ridge on the surface of said rim extending from said rim in a direction perpendicular to the surface of said grid, and flattening said first ridge to form a first surface disposed a predetermined distance away from a surface on the opposite side of said grid.

2. The method according to claim 1, including the steps of forming a second ridge on said rim extending in the opposite direction from said first ridge, and flattening said second ridge to form a second surface a predetermined distance from said first surface.

3. The method according to claim 1, wherein said flattening step is performed by passing said grid through a pair of rollers having a fixed nip.

4. The method according to claim 1, wherein said flattening step is performed by pressing opposite sides of said grid together until each portion of said grid attains a maximum predetermined thickness.

5. The method according to claim 1, wherein said flattening step is performed by removing material from said ridge until said predetermined distance is attained.

6. A method of producing a battery electrode plate having a predetermined constant thickness of active paste comprising, forming a battery grid with a ridge extending in a direction perpendicular to the surface of said grid, flattening said ridge to form a first surface spaced from a surface on the opposite side of said grid by a predetermined distance, applying paste to opposite surfaces of said grid, and removing any paste extending beyond said surfaces.

References Cited by the Examiner

UNITED STATES PATENTS

| | | | |
|---|---|---|---|
| 1,547,038 | 7/1925 | Holland et al. | 29—2 |
| 2,716,146 | 8/1955 | Raney | 136—36 |

RICHARD H. EANES, JR., *Primary Examiner.*